United States Patent Office 3,511,541
Patented May 12, 1970

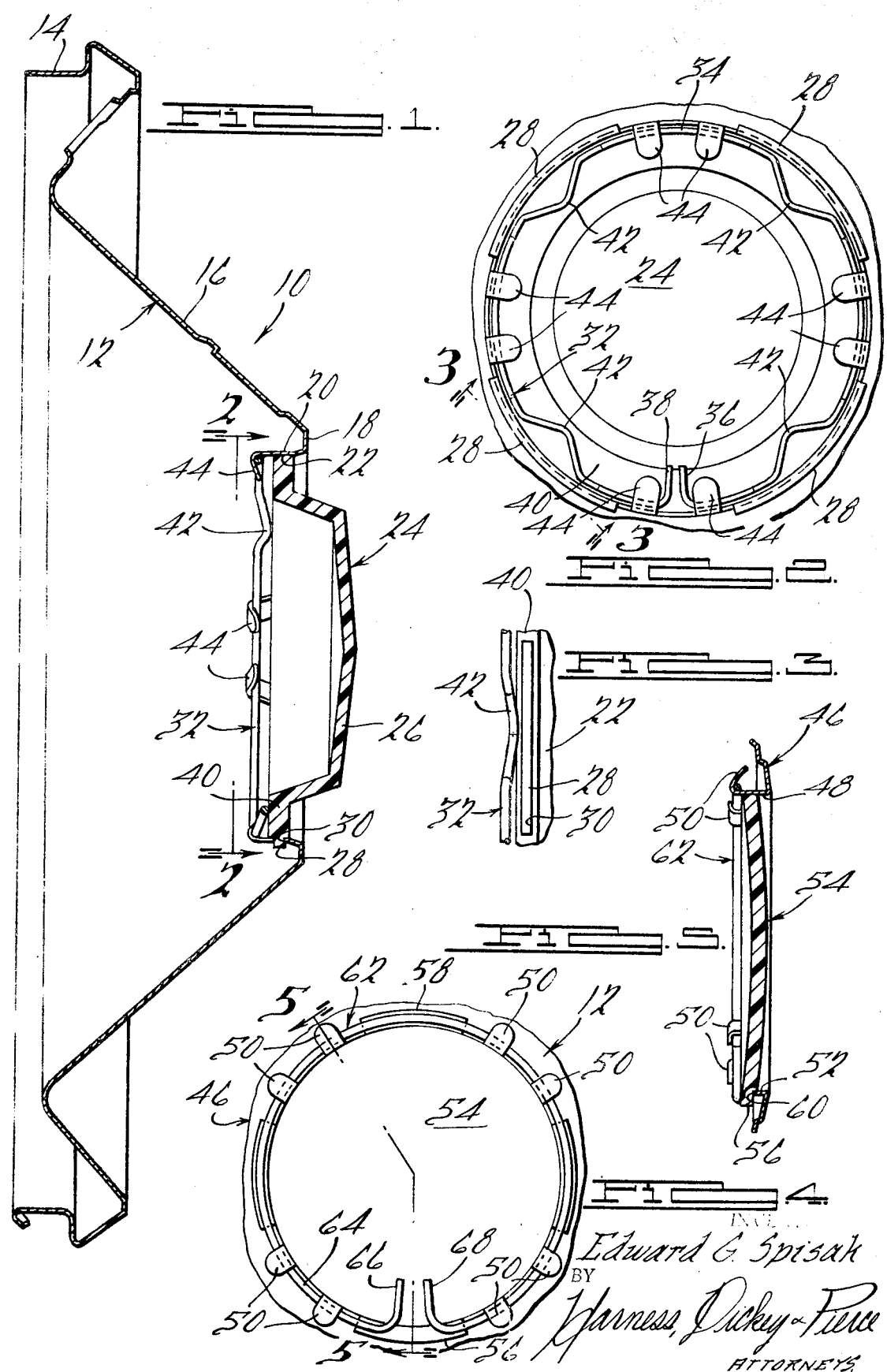

3,511,541
WHEEL COVER
Edward G. Spisak, Wayne, Mich., assignor to Gar Wood Industries, Inc., Wayne, Mich., a corporation of Michigan
Filed June 5, 1968, Ser. No. 734,749
Int. Cl. B60b 7/04
U.S. Cl. 301—37                                          1 Claim

ABSTRACT OF THE DISCLOSURE

In combination in a vehicle wheel cover, a ring member having a substantially radially extending section provided with means adjacent the outer periphery thereof for rleasably engaging a portion of an associated vehicle wheel, the ring member having a generally axially inwardly extending flange section defining a central annular opening, an annular disc-like medallion member having a body portion positioned in and shaped to substantially close the opening, the disc member also having a peripheral shoulder portion projecting radially outwardly from the body portion beyond the inner periphery of the flange section, a generally annular retaining ring coaxially aligned with the flange section and comprising at least one radially inwardly projecting portion overlying the disc body portion and positively engaged therewith, and a plurality of circumferentially spaced tab portions on the flange section and extending radially over the retaining ring for securing the retaining ring and the medallion to the ring member.

BACKGROUND OF THE INVENTION

It is frequently desirable to provide decorative wheel covers for automotive wheels with emblems or medallions which function, for example, to enhance the aesthetic appearance of the wheel covers and/or indicate the brand or make of vehicle with which the wheel covers are operatively associated. It is preferable that such medallions be located at the center of the associated wheel covers and be supported thereon in a manner so as to positively prevent any relative indexing movement which may result in adversely effecting the appearance of the wheel covers and, more seriously, result in sources of objectionable vibration or noise during rotation of the vehicle wheels.

In accordance with the principles of the present invention, a new and improved vehicle wheel cover construction is provided which is adapted for operative association with a centrally located emblem or medallion of the aforementioned type. The wheel cover is provided with a novel retaining ring arrangement which is designed to exert a compressive and resilient force against the medallion and thereby assure positive mounting thereof within a complementary shaped annular opening located at the center of the wheel cover. The retaining ring itself is secured to the wheel cover by means of a plurality of tab-like elements which extend radially over the axially inner side of the ring. By virtue of the resilient and compressive force exterted against the medallion by means of the retaining ring, the medallion is prevented from moving or indexing relative to the wheel cover, thus obviating the possibility of the medallion producing vibrational noise or adversely affecting the appearance of the wheel cover after extended operational use thereof.

SUMMARY OF THE INVENTION

This invention relates generally to decorative covers for wheels of motor vehicles and the like and, more particularly, to a new and improved wheel cover construction adapted to have a centrally located medallion or emblem fixedly secured thereto.

It is accordingly a general object of the present invention to provide a new and improved wheel cover construction.

It is a more particular object of the present invention to provide a new and improved wheel cover of the above character which includes means for positively retaining a centrally located medallion or the like thereon.

It is yet a more particular object of the present invention to provide a wheel cover of the above described type wherein the means for securing the medallion thereto is in the form of an annular retaining ring and means integrally formed on the wheel cover for securing the retaining ring and medallion thereto.

It is another object of the present invention to provide a wheel cover construction of the above described type which is of an extremely simple design and hence provides for easy assembly and economical manufacturing.

Other objects and advantages of the present invention will become apparent from the following detailed description taken in conjunction with the accompanying drawing.

BRIEF DESCRIPTION OF THE DRAWING

FIG. 1 is a transverse cross-sectional view of a vehicle wheel cover embodying the principles of the present invention;

FIG. 2 is a fragmentary side elevational view of a portion of the wheel cover shown in FIG. 1, as taken substantially along the line 2—2 of FIG. 1;

FIG. 3 is a fragmentary cross-sectional view taken substantially along the line 3—3 of FIG. 2;

FIG. 4 is a fragmentary side elevational view similar to FIG. 2 illustrating an alternate embodiment of the wheel cover of the present invention; and FIG. 5 is a transverse cross-sectional view taken substantially along the line 5—5 of FIG. 4.

DETAILED DESCRIPTION OF A PREFERRED EMBODIMENT

For convenience of description, the terms "axially inner," "axially outer" and words of similar import will have reference to the wheel cover of the present invention hereinafter described in detail, with the axially outer side of the subject wheel cover being at the right side of FIG. 1. Likewise, the terms "radially inner," "radially outer," and derivatives thereof will have reference to the geometric center of the wheel cover of the present invention and the various component parts thereof.

Referring now to the drawing, a vehicle wheel cover assembly 10, in accordance with a preferred embodiment of the present invention, is shown as comprising a main wheel cover member 12 having an annular retaining ring section 14 around the outer periphery thereof which is adapted to function in a conventional manner in securing the cover assembly 10 to an associated vehicle wheel (not shown). The cover member 12 may be of any desired decorative appearance and in the embodiment illustrated herein, is provided with a radially inwardly and axially outwardly inclined section 16 which terminates at its radially innermost portion at a generally flat radially extending portion 18. A cover member 12 is provided with an axially inwardly extending flange section 20 which is integrally connected to the radial portion 18 and defines a central opening 22 within which a decorative disc-like emblem or medallion, generally designated 24 is located. The medallion may be of any suitable decorative appearance and may be fabricated, for example, of plastic or the like.

Referring now to FIGS. 1 and 2, in accordance with the principles of the present invention, the medallion 24 comprises a main body portion 26 which is circular in shape and entirely closes the opening 22. A plurality of circumferentially spaced, radially outwardly extending shoulder portions 28 are integrally formed around the body portion 26 and are adapted to be received within complementary shaped openings 30 formed around the flange section 20 of the cover member 12, whereby the medallion 24 is attached to the wheel cover member 12 in the manner shown in FIG. 1.

Disposed directly axially inward from the medallion 24 is an annular retaining ring, generally designated 32, which comprises an annular section 34 which has two confronting end portions 36 and 38 bent or similarly deformed radially inwardly in the manner shown in FIG. 2, whereby the end portions 36, 38 overlie a radially extending peripheral section 40 of the medallion 24. The retaining ring 32 is preferably fabricated of a suitable relatively heavy gauge spring steel and is formed with a plurality of radially inwardly extending generally V-shaped deformed portions 42 which also overlie the peripheral section 40 of the medallion 24 in the same manner as the end portions 36, 38. The V-shaped portions 42 are deformed or bent axially outwardly relative to the plane of the retaining ring 32, as best seen in FIG. 3, with the result that the radially innermost part of each of the portions 42 firmly engage the axially inner side of the peripheral section 40 upon assembly thereof. In a preferred construction of the present invention, the portions 42 of the retaining ring 32 are bent axially outwardly a somewhat greater amount than that shown in FIG. 3 such that when the retaining ring 32 is fixedly secured to the wheel cover member 12 in the manner hereinafter described, a resilient outwardly directed compressive force is exerted against the peripheral section 40 of the medallion 24 by the retaining ring portions 42, hence fixedly securing the medallion 24 to the assembly 10.

The retaining ring 32 is adapted to be fixedly secured to the assembly 10 by means of a plurality of tab portions, generally designated 44, which are circumferentially spaced around the opening 22 and are integrally connected to the axially inner edge of the flange section 20. As best seen in FIG. 2, upon assembly of the medallion 24 on the wheel cover member 12, the tab portions 44 are bent or similarly deformed radially inwardly over the axially inner side of the retaining ring 32, thereby positively securing the ring 32 and the medallion 24 to the cover member 12.

FIGS. 4 and 5 illustrate a slightly modified embodiment of the present invention wherein a wheel cover member 46 which, by way of example, may be of substantially the same construction as the aforedescribed cover member 12, is formed with an axially inwardly extending flange section 48 having a plurality of tab portions 50 integrally formed on the axially inner edge thereof. The flange section 48 defines a central annular opening 52 within which an annular disc-like medallion 54 is disposed, the medallion 54 having a pair of diametrically opposed, radially outwardly extending shoulder portions 56 and 58 which are adapted to be received within a pair of recessed portions 60 formed in the axially innermost part of the flange section 48, as best seen in FIG. 4. An annular retaining ring 62, having a main circular portion 64 and a pair of radially inwardly extending end portions 66 and 68, is disposed directly axially inwardly from the medallion 54, with the inside diameter of the retaining ring 62 being slightly larger than the outside diameter of the flange section 48, whereby the tab portions 50 may be bent radially outwardly over the axially inner side of the retaining ring 62 in the manner illustrated in FIG. 5. In operation, the retaining ring 62 will function to exert a radially inwardly compressive force against the flange section 48, and the end portions 66, 68 will exert an axially outwardly directed force against the axially inner side of the medallion 54, hence positively maintaining the shoulder portions 56, 58 thereof within the recessed portions 60 to positively prevent any relative movement between the medallion 54 and wheel cover member 46.

It will be seen from the above that the present invention provides a novel means for effectively mounting a medallion or emblem on an associated vehicle wheel cover in a manner such that any indexing or other relative movement between the medallion and the wheel cover is positively prevented, with the result that the possibility of the medallion producing any vibrational noises or the like is minimized to the extreme. By virtue of the fact that the present invention is of an extremely simple design, manufacturing and assembly costs of the wheel cover of the present invention will also be minimized, thereby enhancing the economies of mass production.

While it will be apparent that the preferred embodiment illustrated herein is well calculated to fulfill the objects above stated, it will be appreciated that the present invention is susceptible to modification, variation and change.

I claim:
1. In combination in a vehicle wheel cover,
a ring member having a substantially radially extending section provided with means adjacent the outer periphery thereof for releasably engaging a portion of an associated vehicle wheel,
said ring member having a generally axially inwardly extending flange section defining a central annular opening,
a disc member having a body portion positioned in and shaped to substantially close said opening,
said disc member also having at least two peripheral shoulder portions projecting radially outwardly from said body portion beyond the inner periphery of said flange section,
said peripheral shoulder portions of said disc member being received within circumferentially aligned recessed portions provided in said flange section,
a generally annular spring retaining ring coaxially aligned with said flange section and comprising at least one radially inwardly projecting portion overlying said disc body portion and adapted to exert an axially outwardly directed force against the axially inner side thereof, and
a plurality of circumferentially spaced tab portions on said flange section extending radially over said retaining ring for securing said retaining ring and said disc to said ring member.

References Cited

UNITED STATES PATENTS

| 2,097,511 | 11/1937 | Caestecker. |
| 2,674,495 | 4/1954 | Lyon. |
| 2,821,438 | 1/1958 | Lyon. |
| 3,172,704 | 3/1965 | Wise. |

RICHARD J. JOHNSON, Primary Examiner

U.S. Cl. X.R.

40—129